United States Patent
Oishii et al.

(10) Patent No.: US 9,395,599 B2
(45) Date of Patent: Jul. 19, 2016

(54) FOCAL PLANE SHUTTER AND OPTICAL APPARATUS

(71) Applicant: SEIKO PRECISION INC., Narashino-shi (JP)

(72) Inventors: Seiichi Oishii, Narashino (JP); Shoichi Tokura, Narashino (JP)

(73) Assignee: SEIKO PRECISION INC., Narashino-shi (JP)

( * ) Notice: Subject to any disclaimer, the term of this patent is extended or adjusted under 35 U.S.C. 154(b) by 0 days.

(21) Appl. No.: 14/626,014

(22) Filed: Feb. 19, 2015

(65) Prior Publication Data

US 2015/0268533 A1    Sep. 24, 2015

(30) Foreign Application Priority Data

Mar. 24, 2014   (JP) ................. 2014-060110

(51) Int. Cl.
    *G03B 9/08*    (2006.01)
    *G03B 9/40*    (2006.01)
    *G03B 9/36*    (2006.01)

(52) U.S. Cl.
    CPC ... *G03B 9/40* (2013.01); *G03B 9/36* (2013.01)

(58) Field of Classification Search
    CPC .......................................................... G03B 9/40
    USPC .................................................. 396/456, 471
    See application file for complete search history.

(56) References Cited

U.S. PATENT DOCUMENTS

| | | | |
|---|---|---|---|
| 5,467,160 A | * | 11/1995 | Matsubara et al. ........... 396/456 |
| 2011/0150457 A1 | * | 6/2011 | Chung .................... G03B 9/32 396/456 |
| 2014/0078374 A1 | * | 3/2014 | Matsumoto ................... 348/335 |

FOREIGN PATENT DOCUMENTS

JP    2002-296640 A1    10/2002

* cited by examiner

*Primary Examiner* — Clayton E Laballe
*Assistant Examiner* — Dennis Hancock
(74) *Attorney, Agent, or Firm* — Kratz, Quintos & Hanson, LLP

(57) ABSTRACT

A focal plane shutter includes: a first board including a first opening; a first shutter including plural first blades, and facing the first board and closing the first opening such that an overlapped state where the plural first blades overlap each other is shifted to an expanded state where the plural first blades expand; and a drive member connected to a root portion of the first shutter and causing the first shutter to move.

6 Claims, 11 Drawing Sheets

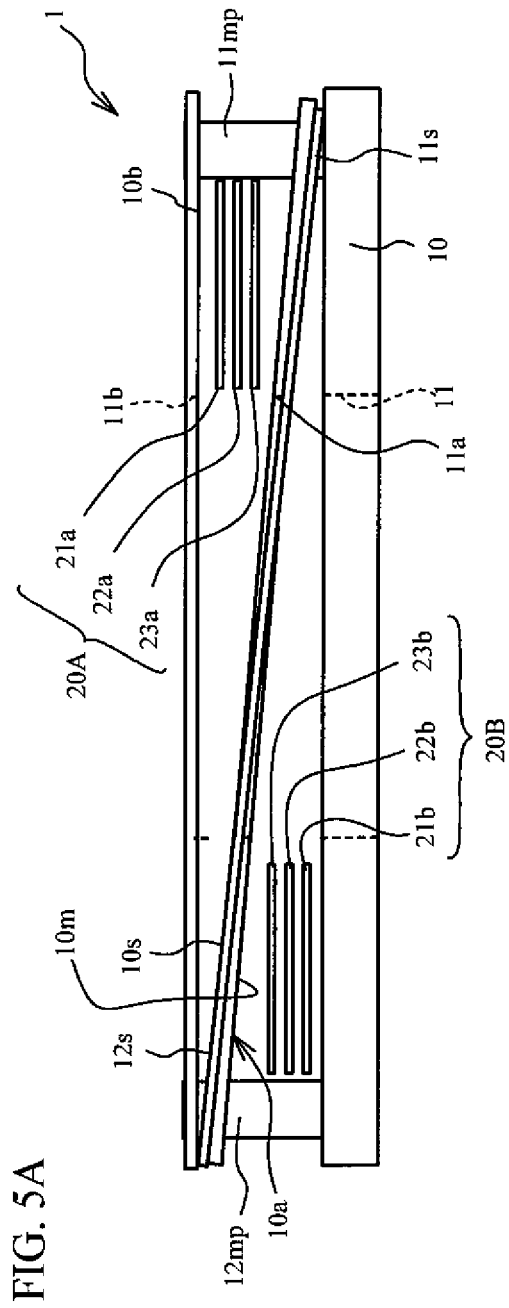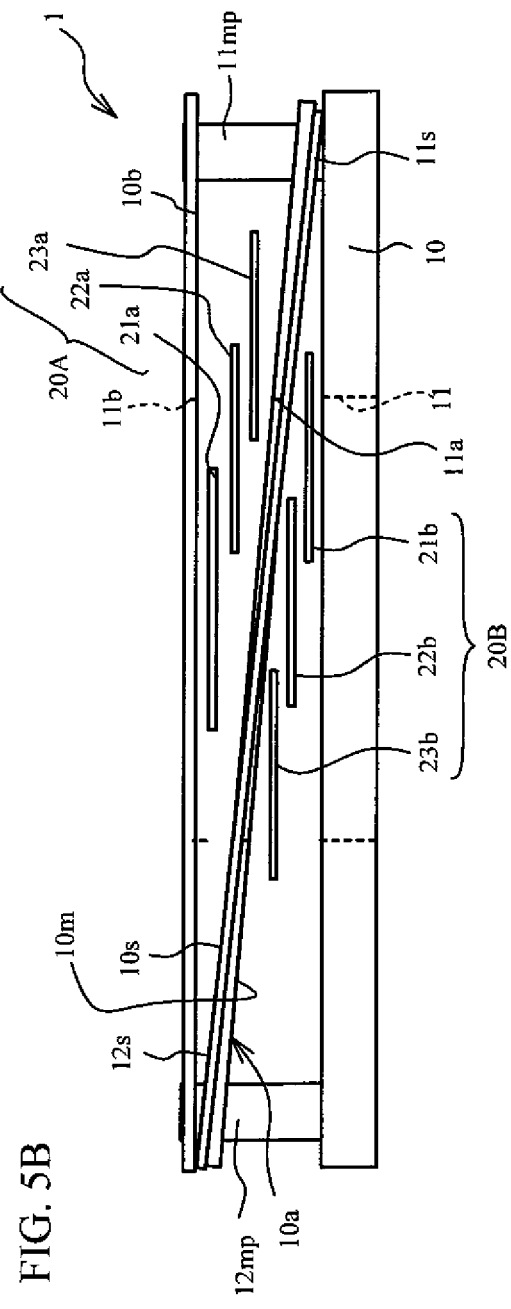

FOCAL PLANE SHUTTER AND OPTICAL APPARATUS

CROSS-REFERENCE TO RELATED APPLICATION

This application is based upon and claims priority to Japanese Patent Application No. 2014-060110 filed on Mar. 24, 2014, subject matter of this patent document is incorporated by reference herein in its entirety.

BACKGROUND (i) Technical Field

The present invention relates to focal plane shutters and optical apparatus.

(ii) Related Art

Japanese Unexamined Patent Application Publication No. 2002-296640 discloses a focal plane shutter in which a shutter opens and closes an opening of a board.

The shutter includes plural blades. The shutter moves and closes the opening such that an overlapped state where the plural blades overlap each other is shifted to an expanded state where the plural blades expand. Herein, an overlapping amount of the plural blades is reduced in the expanded state, so that the shutter might be warped. For this reason, when the shutter moves from the overlapped state to the expanded state, the shutter might be warped to come into contact with the board. As a result, the shutter might be damaged.

SUMMARY

It is therefore an object of the present invention to provide a focal plane shutter and an optical apparatus suppressing damage to a shutter.

According to an aspect of the present invention, there is provided a focal plane shutter including: a first board including a first opening; a first shutter including plural first blades, and facing the first board and closing the first opening such that an overlapped state where the plural first blades overlap each other is shifted to an expanded state where the plural first blades expand; and a drive member connected to a root portion of the first shutter and causing the first shutter to move, wherein the first board includes: a main board; and a sub-board secured to the main board, the main board and the sub-board cooperatively define the first opening, the main board includes: first and second portions extending in a direction intersecting with a movement direction of the first shutter, and facing each other; and a third portion continuous to the first and second portions, extending in the movement direction, and positioned in the root portion side, front end portions of the first and second portions are spaced away from each other, when the first shutter closes the first opening, the first shutter moves from the second portion side to the first portion side, the sub-board faces the third portion, extends in the movement direction, is positioned in a front end portion side of the first shutter, and is secured to the front end portions of the first and second portions, one end of the sub-board is secured to a surface, of the first portion, facing the first shutter, another end of the sub-board is secured to the second portion, and a portion between the one end and the another end does not overlap the main board.

BRIEF DESCRIPTION OF THE DRAWINGS

FIGS. 5A and 5B are left side views of the focal plane shutter;

DETAILED DESCRIPTION

Figure 1:
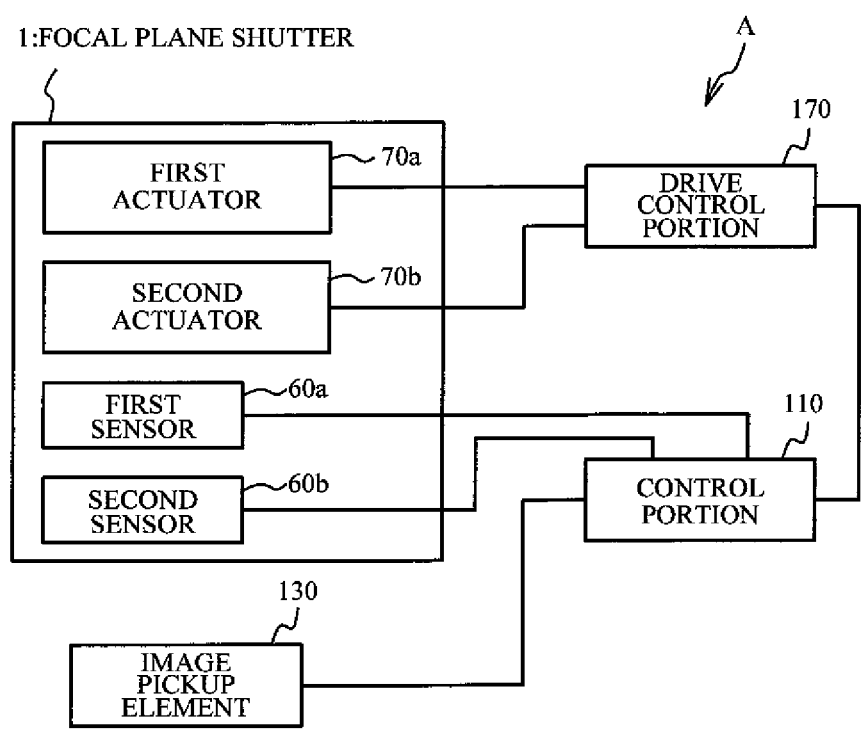
FIG. 1 is a block diagram of a camera including a focal plane shutter.

FIG. 1 is a block diagram of a camera (optical apparatus) A including a focal plane shutter 1. The camera A includes the focal plane shutter 1, a control portion 110, an image pickup element 130, and a drive control portion 170. The focal plane shutter 1 includes a first actuator (hereinafter, referred to as actuator) 70a, a second actuator (hereinafter, referred to as actuator) 70b, a first sensor (hereinafter, referred as sensor) 60a, and a second sensor (hereinafter, referred as sensor) 60b, as will be described later in detail. The drive control portion 170 controls the drive of the actuators 70a and 70b in accordance with the instruction from the control portion 110. The drive control portion 170 includes a CPU. The control portion 110 instructs the drive control portion 170 in accordance with the signals from the sensors 60a and 60b. The drive control portion 170 receives this instruction to control the drive of the actuators 70a and 70b. The control portion 110 controls the operation of the whole camera, and includes the CPU, a ROM, a RAM and the like. The image pickup element 130 is a CMOS. The image pickup element 130 is a light receiving element that converts subject images into electric signals on the basis of photoelectric conversion. Moreover, the camera A includes lenses, not illustrated in FIG. 1, for adjusting a focal length.

Figure 2:
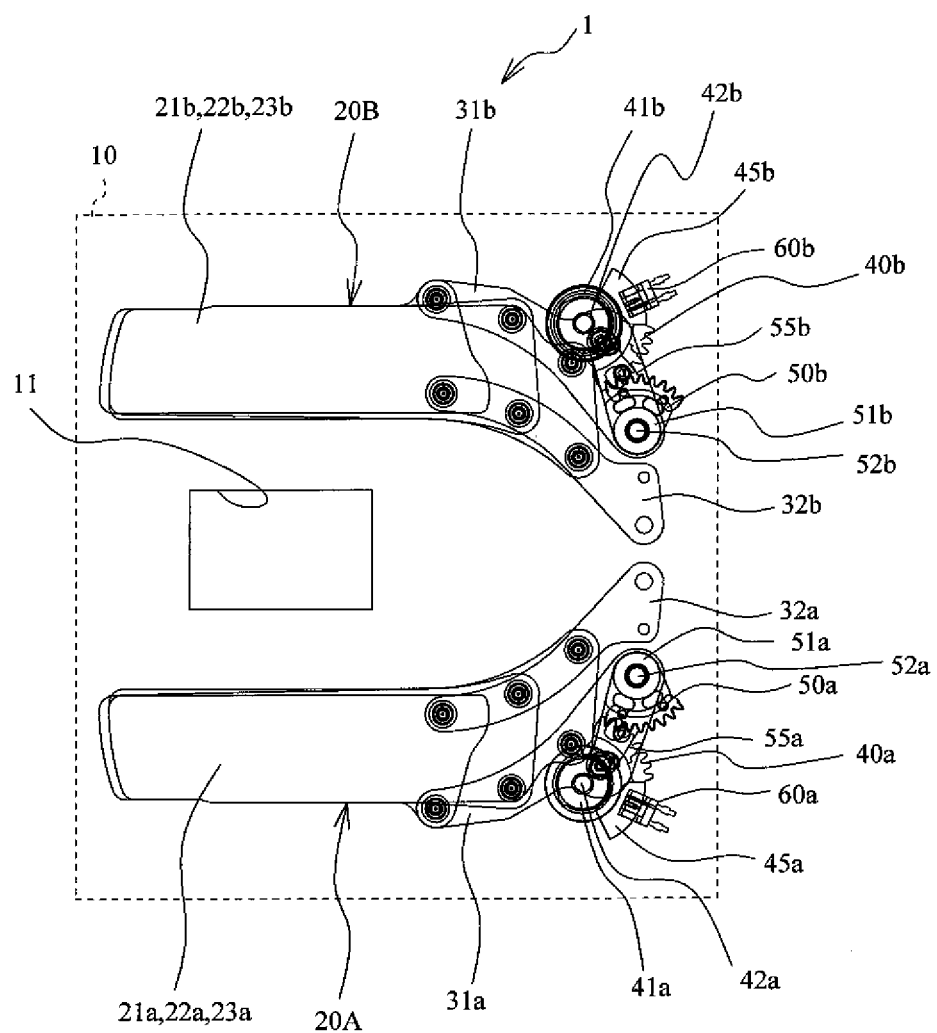
FIG. 2 is a front view of the focal plane shutter.

FIG. 2 is a front view of the focal plane shutter 1. In FIG. 2, the actuators 70a and 70b are omitted. The focal plane shutter 1 includes a board 10, a leading shutter 20A, a trailing shutter 20B, arms 31a, 32a, 31b, and 32b, and the actuators 70a and 70b. The board 10 is provided with a rectangular opening 11. The leading shutter 20A and the trailing shutter 20B are respective examples of first and second shutters. The actuators 70a and 70b are respective examples of first and second actuators.

The leading shutter 20A includes three blades 21a to 23a. The trailing shutter 20B includes three blades 21b to 23b. FIG. 2 illustrates the leading shutter 20A and the trailing shutter 20B in overlapped states. In FIG. 2, the leading shutter 20A and the trailing shutter 20B recede from the opening 11. The leading shutter 20A is connected to the arms 31a and 32a. The trailing shutter 20B is connected to the arms 31b and 32b. These arms 31a, 32a, 31b, 32b are rotatably supported by the board 10.

The board 10 is provided with a first drive lever 55a (hereinafter, referred to as drive lever) and a second drive lever 55b (hereinafter, referred to as drive lever) for driving the arms 31a and 31b, respectively. The drive levers 55a and 55b are connected with gears 50a and 50b, respectively. The gears 50a and 50b engage gears 40a and 40b, respectively. The gears 40a, 40b, 50a, and 50b respectively include pipe portions 41a, 41b, 51a, and 51b, and are supported by the board 10 for rotation about spindles 42a, 42b, 52a, and 52b fitting into the pipe portions thereof, respectively. Additionally, the spindles 42a, 42b, 52a, and 52b do not have to be always formed on the board 10 in which the opening 11 is formed, and have only to be positionally fixed with respect to the opening 11.

The gears 40a and 40b are connected with rotors of the actuators 70a and 70b, respectively. The driving of the actuator 70a drives the gears 40a and 50a, thereby driving the drive lever 55a. The driving of the drive lever 55a drives the arm 31a. Thus, the leading shutter 20A moves. The leading shutter 20A is movable between a receded position where the leading shutter 20A recedes from the opening 11 and a closed position where the leading shutter 20A closes the opening 11. The leading shutter 20A is moved between the receded position and the closed position by the actuator 70a. The gears 40b and 50b, the drive lever 55b, and the trailing shutter 20B each has the similar configuration.

The gears 40a and 40b are provided with thin plates 45a and 45b, respectively. The thin plates 45a and 45b rotate together with the gears 40a and 40b, respectively. The thin plates 45a and 45b each has a fan shape. The sensors 60a and 60b detect whether or not the thin plates 45a and 45b pass through the sensors 60a and 60b to detect the positions of the leading shutter 20A and the trailing shutter 20B, respectively.

Figure 3:
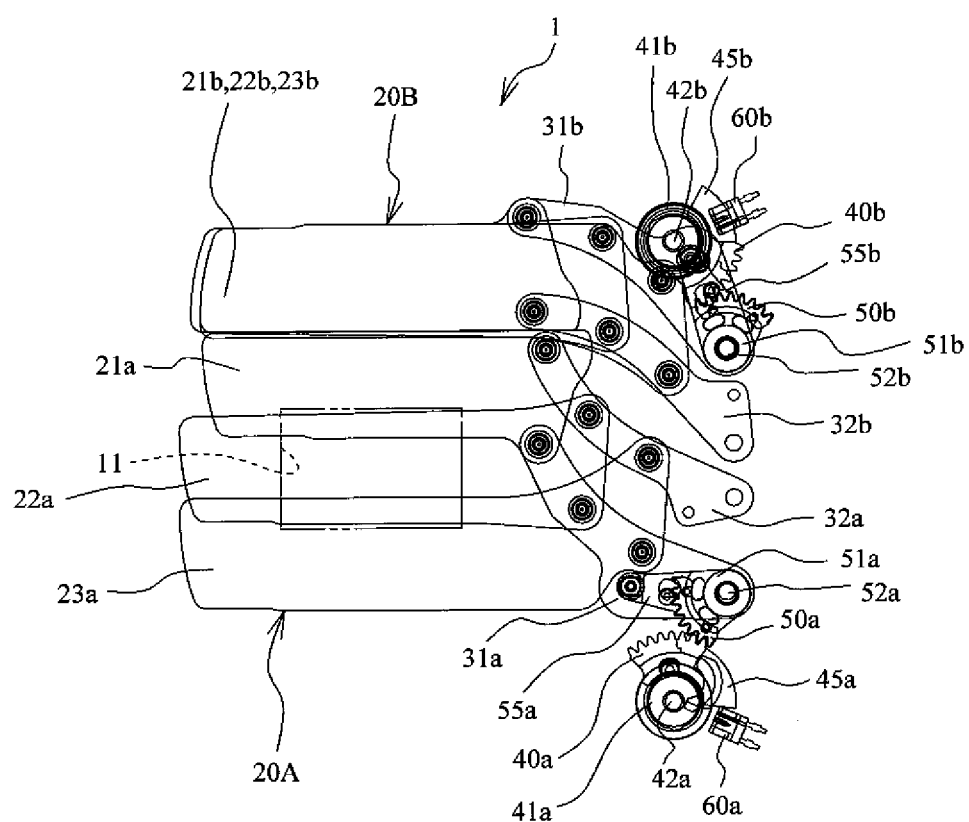
FIG. 3 is an explanatory view of an operation of the focal plane shutter.
Figure 4:
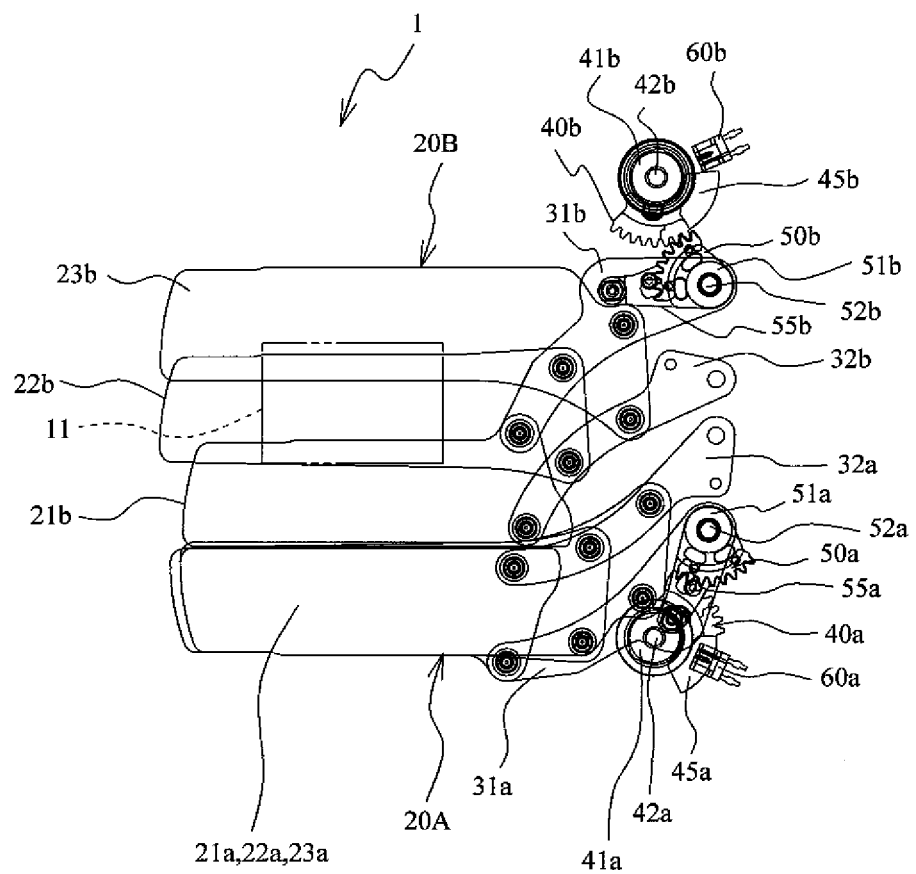
FIG. 4 is an explanatory view of the operation of the focal plane shutter.

Next, operation of the focal plane shutter 1 will be described. FIGS. 2 to 4 are explanatory views of the operation of the focal plane shutter 1. In a wait state, as illustrated in FIG. 2, the leading shutter 20A and the trailing shutter 20B are positioned at the respective receded positions, and the opening 11 is maintained in the fully opened state.

The camera A is adaptable to a live view mode of displaying images from an image pickup element on a crystal liquid monitor or the like in real time. That is, the camera A is a digital camera. Thus, in the live view mode, the state illustrated in FIG. 2 is maintained.

When a release switch of the camera A is pushed, a charging operation starts. When the charging operation starts, a coil of the actuator 70a is energized such that the leading shutter 20A moves and closes the opening 11. Specifically, the gear 40a rotates counterclockwise, and then the gear 50a rotates clockwise, which causes the arm 31a to drive.

After that, the coil of the actuator 70a stops being energized in the state where the leading shutter 20A closes the opening 11 and the trailing shutter 20B recedes from the opening 11. In such a way, the charging operation is finished. FIG. 3 illustrates the focal plane shutter 1 in the state where the charging operation is finished. In FIG. 3, the leading shutter 20A is positioned at the closed position, and the trailing shutter 20B is positioned at the receded position.

After a predetermined waiting period elapses from the time when the charging operation is finished, an exposure operation starts. The control portion 110 instructs the drive control portion 170 to energize the coil of the actuator 70a such that the leading shutter 20A moves and opens the opening 11. Specifically, the gear 40a drives clockwise, so the gear 50a drives counterclockwise. At this time, the arm 31a moves and the leading shutter 20A moves. The control portion 110 detects the change in the output signal from the sensor 60a, thereby detecting that the leading shutter 20A moves away from the opening 11. When the leading shutter 20A recedes from the opening 11, the state illustrated in FIG. 2 is shifted again.

After a predetermined period elapse from the time when the control portion 110 detects that the leading shutter 20A moves away from the opening 11 based on the sensor 60a, the control portion 110 energizes the coil of the actuator 70b to start moving the trailing shutter 20B. Therefore, the trailing shutter 20B moves to close the opening 11. When the leading shutter 20A fully recedes from the opening 11 and the trailing shutter 20B fully closes the opening 11, the energization of the coils of the actuators 70a and 70b is cut. FIG. 4 illustrates the state where the leading shutter 20A is positioned at the receded position and the trailing shutter 20B is positioned at the closed position. In such a way, the exposure operation is finished.

After the exposure operation is finished, the data are output to a RAM of the control portion 110 or a memory of the camera. Next, the coil of the actuator 70b is energized so that the trailing shutter 20B moves away from the opening 11 to maintain the opening 11 in the fully opened state, whereby the state returns to the wait state illustrated in FIG. 2.

Additionally, the actuator 70a includes: a rotor; a stator energized to exert the magnetic force between the rotor and the stator; and a coil for energizing the stator. The rotor is a permanent magnet magnetized to have different magnetic polarities in its circumferential direction. The rotor is rotatably supported by the spindle 42a. A gear 40a is secured to the rotor. The rotation of the rotor causes the leading shutter 20A to drive. Likewise, the actuator 70b includes a rotor, a stator, and a coil. The rotor of the actuator 70b is rotatably supported by a spindle 42b, and is secured with a gear 40b. The rotation of the rotor of the actuator 70b causes the trailing shutter 20B to drive.

Further, in the continuous shooting mode, after the exposure operation is finished, the leading shutter 20A starts moving to close the opening 11 in the state where the trailing shutter 20B closes the opening 11. After that, the leading shutter 20A closes the opening 11 and the trailing shutter 20B moves away from the opening 11, so the charging operation is finished.

FIGS. 5A and 5B are left side views of the focal plane shutter 1. The focal plane shutter 1 includes a partition board 10a and a receiving board 10b that are secured to the board 10. The partition board 10a is arranged between the board 10 and the receiving board 10b. The board 10 is provided with pins 11mp and 12mp that are inserted into respective holes of the partition board 10a and the receiving board 10b such that the partition board 10a and the receiving board 10b are secured to the board 10. The partition board 10a partitions the space between the board 10 and the receiving board 10b into the space where the leading shutter 20A moves and the space where the trailing shutter 20B moves. The partition board 10a is arranged obliquely to the board 10 and the receiving board 10b substantially parallel to each other. The partition board 10a and the receiving board 10b respectively include openings 11a and 11b positionally corresponding to the opening 11. The leading shutter 20A faces the partition board 10a, and the trailing shutter 20B races the partition board 10a in opposition to the leading shutter 20A. FIG. 5A illustrates a wait state where the opening 11 is fully opened. In the wait state, as illustrated in FIG. 5A, the blades 21a to 23a are positioned away from the opening 11 in the overlapped state, and the blades 21b to 23b are positioned away from the opening 11 in the overlapped state.

FIG. 5B illustrates a state during which the leading shutter 20A is moving to close the opening 11 in the state where the trailing shutter 20B closes the opening 11, for example, in the continuous shooting mode. Also, even in a normally-closed type camera in which the opening 11 is always closed in the wait state, the charging operation is performed as illustrated in FIG. 5B. The overlapped state where the blades 21a to 23a overlap one another is shifted to the expanded state where the blades 21a to 23a expand, so the leading shutter 20A closes the opening 11. Further, the blades 21a to 23a are shifted from the expanded state to the overlapped state, so the leading shutter 20A moves away from the opening 11. These arrangements are applied to the blades 21b to 23b of the trailing shutter 20B.

Figure 6:
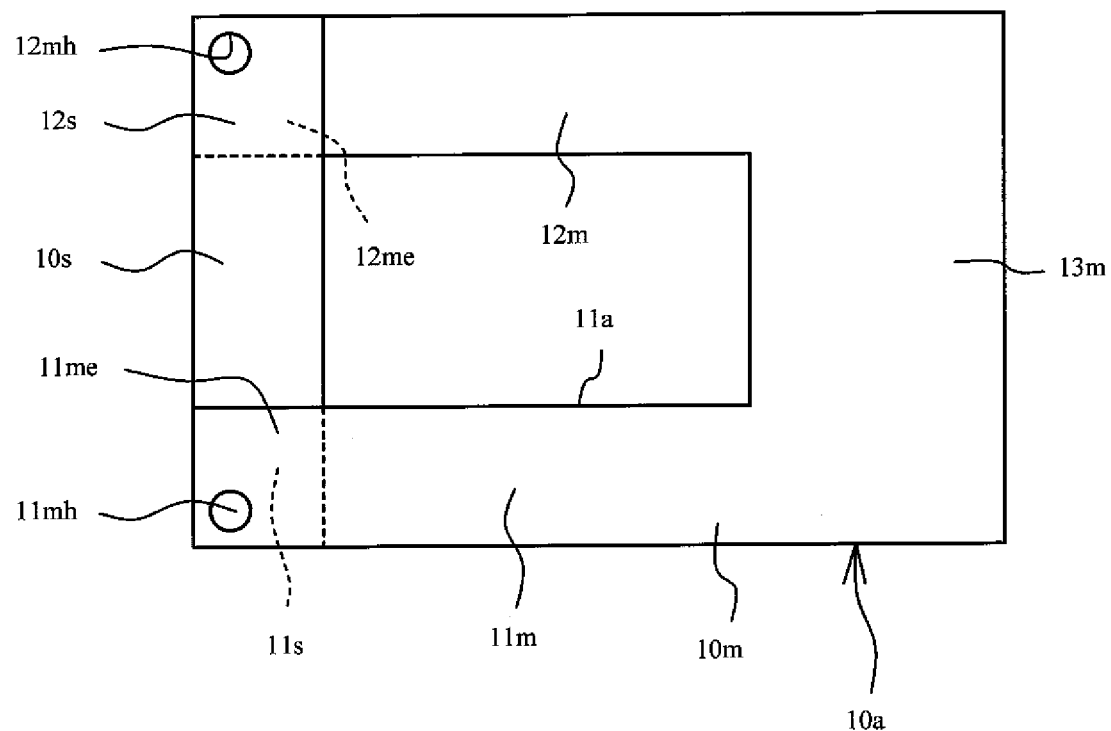
FIG. 6 is a front view of a partition board.

FIG. 6 is a front view of the partition board 10a. The partition board 10a includes a main board 10m and a sub-board 10s secured to each other. The main board 10m and the sub-board 10s cooperatively define the opening 11a. That is, three sides of the opening 11a having a rectangular shape are defined by the main board 10m, and the other side of the opening 11a is defined by the sub-board 10s. The area of the main board 10m is greater than that of the sub-board 10s. Although the main board 10m and the sub-board 10m are made of synthetic resins, the main board 10m and the sub-board 10s may be thin plates made of metals or fiber-reinforced resins.

Figure 7:
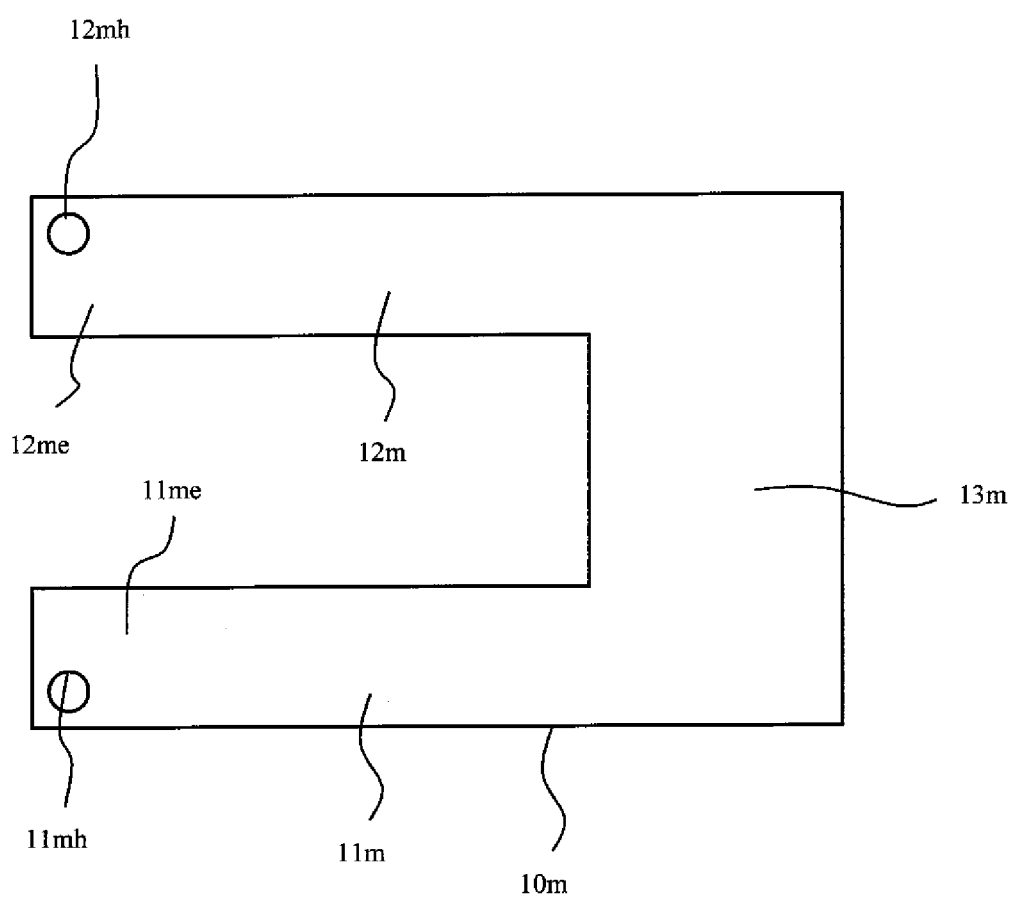
FIG. 7 is a front view of a main board from which a sub-board is removed.

FIG. 7 is a front view of the main board 10m from which the sub-board 10s is removed. The main board 10m includes portions 11m, 12m, and 13m. The portions 11m and 12m are substantially parallel to each other, and extend in the direction substantially perpendicular to the movement directions of the leading shutter 20A and the trailing shutter 20B. The portion 13m extends in the movement directions of the leading shutter 20A and the trailing shutter 20B, is substantially perpendicular to the portions 11m and 12m, and is continuous thereto. The gears 40a, 40b, 50a, and 50b, and the like are arranged in the portion 13m side. Root portions of the leading shutter 20A and the trailing shutter 20B are positioned in the portion 13m side. The portions 11m and 12m are not continuous to each other. Front end portions 11me and 12me of the respective portions 11m and 12m are spaced away from each other. In this way, the main board 10m has a substantially lateral U-shape. In other words, the main board 10m is similar to a frame-shaped board from which a single side is removed. When the opening 11a is closed, the trailing shutter 20B moves from the portion 12m side to the portion 11m side, and the leading shutter 20A moves from the portion 11m side to the portion 12m side. That is, in the overlapped state where the leading shutter 20A and the trailing shutter 20B recede from the opening 11a, the leading shutter 20A is positioned in the portion 11m side, and the trailing shutter 20B is positioned in the portion 12m side. The portions 11m and 12m are examples of respective first and second portions. The portion 13m is an example of a third portion. The trailing shutter 20B is an example of a first shutter. The leading shutter 20A is an example of a second shutter. The partition board 10a is an example of a first board. The opening 11a is an example of a first opening. The board 10 is an example of a second board. The opening 11 is an example of a second opening. The receiving board 10b is an example of a third board. The opening 11b is an example of a third opening.

The sub-board 10s faces the portion 13m of the main board 10m, and is secured to the main board 10m so as to extend substantially in parallel with the portion 13m. Specifically, the sub-board 10s is a thin board extending linearly, and an end portion 11s of the sub-board 10s is secured to the front end portion 11me of the main board 10m, and an other end portion 12s of the sub-board 10s is secured to the front end portion 12me of the main board 10m. The end portion 11s and the front end portion 11me are provided with a hole 12mh into which the pin 11mp is commonly fitted. The other end portion 12s and the front end portion 12me are provided with a hole 12mh into which the pin 12mp is commonly fitted. The sub-board 10s is positioned in the front end side of the leading shutter 20A and the trailing shutter 20B.

Further, the end portion 11s of the sub-board 10s is secured to a surface, of the partition board 10a, facing the trailing shutter 20B. On the contrary, the other end portion 12s of the sub-board 10s is secured to a surface, of the partition board 10a, facing the leading shutter 20A. In such a way, the sub-board 10s is secured to the front and rear surfaces of the partition board 10a, and the sub-board 10s is secured to the main board 10m so as to be slightly oblique thereto. Thus, a surface of the sub-board 10s is exposed from the portion 11m to the leading shutter 20A side, and the other surface of the sub-board 10s is exposed from the portion 12m to the trailing shutter 20B side.

When the trailing shutter 20B moves from the overlapped state to the expanded state to close the opening 11a, the overlapping amount of the blades 21b to 23b of the trailing shutter 20B is reduced, so the trailing shutter 20B might be warped. Thus, the front end portion of the trailing shutter 20B might be warped toward the partition board 10a side. As mentioned above, the end portion 11s of the sub-board 10s is secured to the surface, of the portion 11m, facing the trailing shutter 20B. For this reason, if the front end portion of the trailing shutter 20B is warped toward the partition board 10a side while the trailing shutter 20B is moving to close the opening 11a, the front end portion of the trailing shutter 20B does not come into contact with the main board 10m but with the sub-board 10s. In such a way, the sub-board 10s suppresses the front end portion of the trailing shutter 20B from coming into contact with the main board 10m. Accordingly, this suppresses the damage to the front end portion of the trailing shutter 20B due to the contact thereof with an edge of the portion 11m defining a side of the opening 11a.

Likewise, if the front end portion of the leading shutter 20A is warped toward the partition board 10a side while the leading shutter 20A is moving to close the opening 11a, the front end portion of the leading shutter 20A does not contact with the main board 10m but with the sub-board 10s. Accordingly, this suppresses the damage to the front end portion of the leading shutter 20A due to the contact thereof with an edge of the portion 12m defining a side of the opening 11a.

Further, as illustrated in FIG. 5B, even when the leading shutter 20A moves to close the opening 11a in the state where the trailing shutter 20B closes the opening 11a, the leading shutter 20A is suppressed from coming into contact with the portion 12m of the main board 10m or the trailing shutter 20B.

Further, the central portion between the end portion 11s and the other end portion 12s of the sub-board 10s does not overlap the main board 10m. Thus, the central portion of the sub-board 10s tends to be warped. For this reason, for example, when the front end portion of the leading shutter 20A or the trailing shutter 20B comes into contact with the center portion of the sub-board 10s, the center portion of the sub-board 10s is warped to suppress the impact. This also suppress the damage to the leading shutter 20A and the trailing shutter 20B.

Further, since the single sub-board 10s is secured to the main board 10m, the partition board 10a is suppressed from increasing in its whole thickness. This ensures the size of the space, between the receiving board 10b and the partition board 10a, in which the leading shutter 20A is arranged, and ensures the size of the space, between the board 10 and the partition board 10a, in which the trailing shutter 20B is arranged. Herein, for example, in a case where the space between the receiving board 10b and the partition board 10a is narrow, the leading shutter 20A might come into easier contact with the receiving board 10b or the partition board 10a, so that the resistance to the movement of the leading shutter 20A might be increased. Likewise, in a case where the space between the board 10 and the partition board 10a is narrow, the resistance to the movement of the trailing shutter 20B might be increased. The present embodiment can ensure these spaces, thereby suppressing the increase in the resistances to the movements of the leading shutter 20A and the trailing shutter 20B. Also, the damage to the leading shutter 20A and the trailing shutter 20B is suppressed. Further, since the single sub-board 10s is secured to the main board 10m, an increase in the number of the parts is suppressed, and the damage to both the leading shutter 20A and the trailing shutter 20B is suppressed.

Furthermore, in the present embodiment, the main board 10m and the sub-board 10s are made of the same material. However, the present invention is not limited to this. For example, the sub-board 10s may be made of a material having a rigidity lower than that of the main board 10m. Alternatively, the sub-board 10s may be thinner than the main board 10m. In any case, the sub-board 10s can suppress the impact due to the abutment of the front end portion of the leading shutter 20A or the trailing shutter 20B with the sub-board 10s. For example, the main board 10m may be made of a metal and the sub-board 10s may be made of a synthetic resin.

In addition, in the present embodiment, the single sub-board 10s is secured to the main board 10m. However, the present invention is not limited to this. For example, a single sub-board may be secured to the surfaces, of the front end portions 11me and 12me of the main board 10m, facing the leading shutter 20A, and another sub-board may be secured to the surfaces, of the front end portions 11me and 12me of the main board 10m, facing the trailing shutter 20B. In this case, the space is formed between the center portions of the two sub-boards not overlapping the main board 10m, so that the two sub-boards tend to be warped. This also suppresses the damage to the leading shutter 20A and the trailing shutter 20B. Additionally, in this case, the front end portions of the leading shutter 20A and the trailing shutter 20B moving to close the opening 11a are suppressed from coming into contact with the edges of the portions 12m and 11m, respectively.

Figure 8:
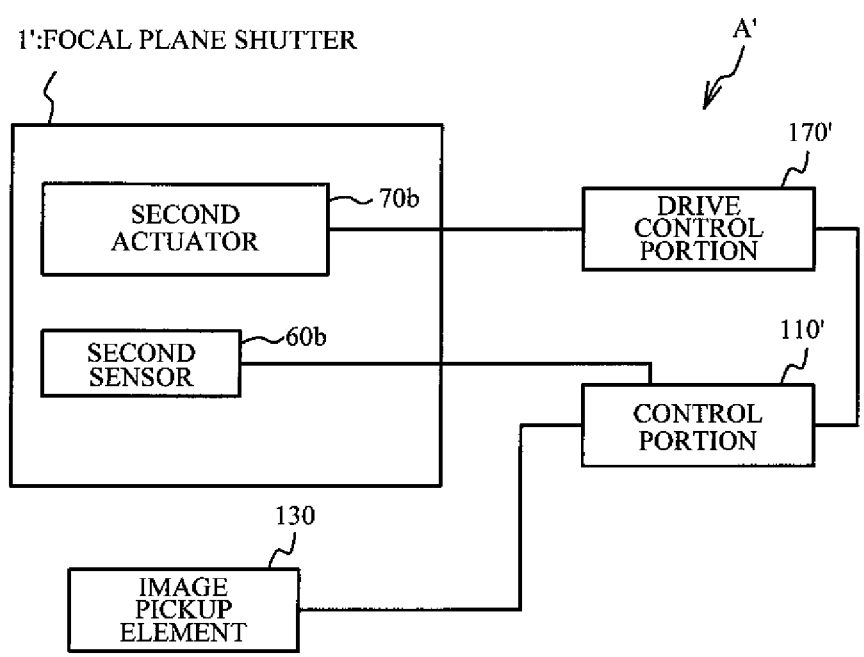
FIG. 8 is a block diagram of a camera including a focal plane shutter according to a variation.

FIG. 8 is a block diagram of a camera A' including a focal plane shutter 1' according to a variation. Additionally, the similar components are designated with the similar reference numerals and the duplication description is omitted. Unlike the focal plane shutter 1, the focal plane shutter 1' does not include the leading shutter 20A, the actuator 70a, the sensor 60a, or the like. A control portion 110' sequentially starts storing charges by sequentially resetting charges stored in the image pickup element 130 for every pixel line in a predetermined direction. Specifically, the storing of charges is sequentially started in the image pickup element 130 in a predetermined timing for every pixel line thereof perpendicular to the movement direction of the trailing shutter 20B. This causes an electronic leading shutter to artificially move from the exposure start position to the exposure end position. After that, a drive control portion 170' causes the trailing shutter 20B to move to close the opening 11 after a predetermined period, so the storing of charges for every pixel line of the image pickup element 130 is sequentially finished. Thus, the exposure operation is finished. The camera A' is an optical apparatus having the function of a so-called electronic leading shutter.

Figure 9:
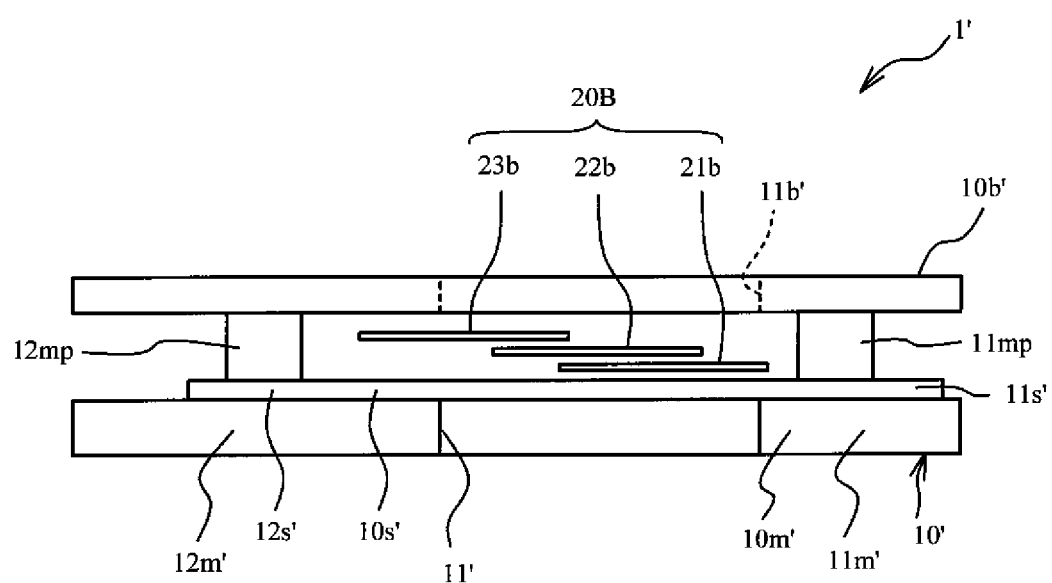
FIG. 9 is a left side view of the focal plane shutter according to the variation.
Figure 10:
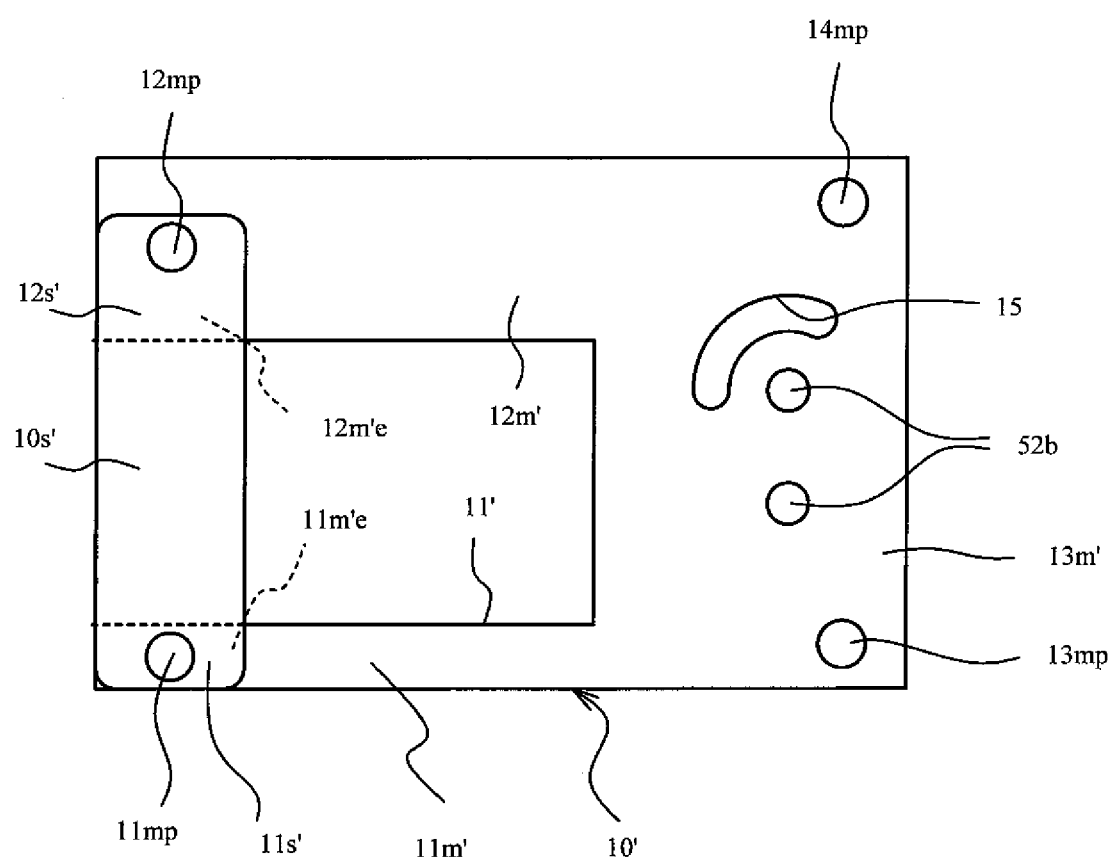
FIG. 10 is a front view of a board.

FIG. 9 is a side view of the focal plane shutter 1' according to the variation. The focal plane shutter 1' includes a board 10' and a receiving board 10b' secured to each other. The board 10' and the receiving board 10b' are provided with respective openings 11' and 11b'. The trailing shutter 20B is arranged between the board 10' and the receiving board 10b', and the partition wall is not provided. FIG. 10 is a front view of the board 10'. A portion 13m' of the board 10' is provided with an arc-shaped escape hole 15 for escaping a drive pin of a drive lever not illustrated. The drive pin of the drive lever engages and drives an arm. Further, the board 10' is provided with spindles 52b that respectively support two arms for driving the trailing shutter 20B. The board 10' is an example of a first board. The opening 11' is an example of a first opening. The receiving board 10b' is an example of a second board. The opening 11b' is an example of a second opening.

The board 10' includes a main board 10m' and a sub-board 10s'. The main board 10m' and the sub-board 10s' cooperatively define the opening 11'. That is, three sides of the opening 11' having a rectangular shape are defined by the main board 10m', and the other side of the opening 11' is defined by the sub-board 10s'. Although the main board 10m' and the sub-board 10s' are made of synthetic resins, the main board 10m' and the sub-board 10s' may be thin plates made of metals or fiber-reinforced resins. The sub-board 10s is thinner than the main board 10m'. The receiving board 10b' is secured to the pins 11mp to 14mp provided in the main board 10m', and the pins 11mp and 12mp are fitted into respective two holes formed in the sub-board 10s'.

Figure 11:
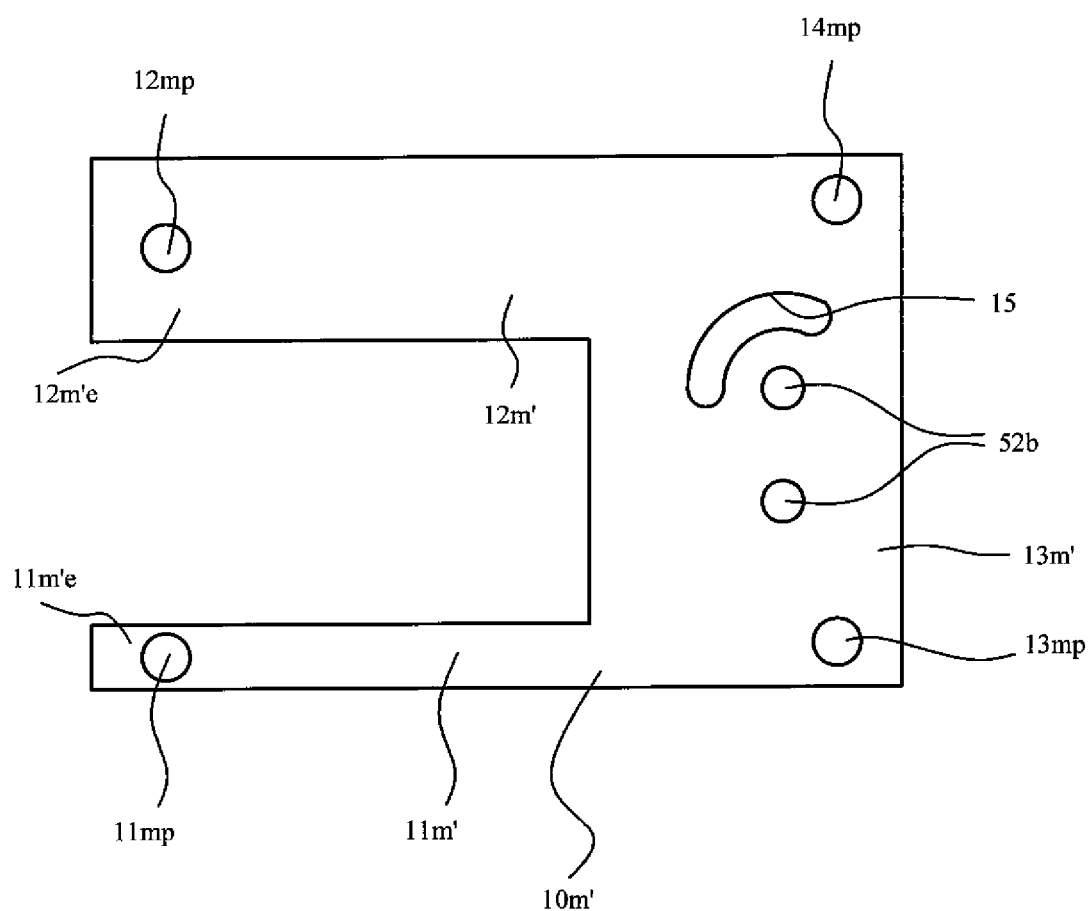
FIG. 11 is a front view of a main board from which the sub-board is removed.

FIG. 11 is a front view of the main board 10m' from which the sub-board 10s' is removed. The sub-board 10s' is secured to a surface, of the board 10', facing the trailing shutter 20B. That is, an end portion 11s' and an other end portion 12s' of the sub-board 10s' are respectively secured to the surfaces of portions 11m' and 12m' of the same side of the board 10'.

If the front end portion of the trailing shutter 20B is warped toward the board 10' side while the trailing shutter 20B is moving to close the opening 11', the front end portion of the trailing shutter 20B does not come into contact with the main board 10m' but with the sub-board 10s'. This suppresses the damage to the trailing shutter 20B due to, for example, the abutment of the front end portion thereof with an edge of the portion 11m' defining a side of the opening 11'.

Further, the central portion of the sub-board 10s' tends to be warped because of not overlapping the main board 10m'. This suppresses the impact caused by the abutment of the front end portion of the trailing shutter 20B with the central portion of the sub-board 10s'. Further, the sub-board 10s' is thinner than the main board 10m' and tends to be warped. This suppresses the damage to the trailing shutter 20B.

The main board 10m' may be made of a metal, and the sub-board 10s' may be made of a synthetic resin. The main board 10m' made of a metal can ensure the whole strength of the focal plane shutter 1', and the sub-board 10s' made of a synthetic resin can suppress the damage to the trailing shutter 20B.

Additionally, in this variation, the board 10' includes two of the main board 10m' and the sub-board 10s'. However, the present invention is not limited to this. At least one of the main board 10m' and the sub-board 10s' may include two members such as the main board and the sub-board.

Additionally, in this variation, the end portion 11s' of the sub-board 10s' may be secured to the surface of the portion 11m' of the board 10' in the trailing shutter 20B side, and the other end portion 12s' of the sub-board 10s' may be secured to the outer surface of the portion 12m' of the board 10'.

In this variation, the leading shutter is not provided. However, a main board and a sub-board may configure at least one of a board and a receiving board of a focal plane shutter including a leading shutter, a trailing shutter, and a partition plate.

While the exemplary embodiments of the present invention have been illustrated in detail, the present invention is not limited to the above-mentioned embodiments, and other embodiments, variations and modifications may be made without departing from the scope of the present invention.

In the above embodiment, each of the leading shutter and the trailing shutter includes three blades. However, the present invention is not limited to this. For example, such a shutter may include two blades or more than three blades.

Although the actuator is used as a drive source for the shutter in the above embodiment and variation, the shutter may be driven by an electromagnet and a spring.

What is claimed is:

1. A focal plane shutter comprising:
   a first board including a first opening;
   a first shutter including plural first blades, and facing the first board and closing the first opening such that an overlapped state where the plural first blades overlap each other is shifted to an expanded state where the plural first blades expand; and
   a drive member connected to a root portion of the first shutter and causing the first shutter to move,
   wherein the first board includes:
      a main board, the main board having a substantially lateral U-shape; and
      a sub-board secured to the main board,
   the main board and the sub-board cooperatively define the first opening,
   the main board includes:
      first and second portions extending in a direction intersecting with a movement direction of the first shutter, and facing each other; and
      a third portion continuous to the first and second portions, extending in the movement direction, and positioned in the root portion side,
   front end portions of the first and second portions are spaced away from each other,
   when the first shutter closes the first opening, the first shutter moves from the second portion side to the first portion side,
   the sub-board faces the third portion, extends in the movement direction, is positioned in a front end portion side of the first shutter, and is secured to the front end portions of the first and second portions,
   one end of the sub-board is secured to a surface, of the first portion, facing the first shutter and another end of the sub-board is secured to a surface of the second portion, opposite to a surface of the second portion facing the first shutter, and
   a portion between the one end and the another end does not overlap the main board.

2. The focal plane shutter of claim 1, comprising a second shutter including plural second blades, facing the first board in opposition to the first shutter, and closing the first opening such that an overlapped state where the plural second blades overlap each other is shifted to an expanded state where the plural second blades expand,
   wherein when the second shutter closes the first opening, the second shutter moves from the first portion side to the second portion side, and
   the another end of the sub-board is secured to a surface, of the second portion, facing the second shutter.

3. The focal plane shutter of claim 2, comprising:
   a second board including a second opening, the first and second boards sandwiching the first shutter; and
   a third board including a third opening, the first and third boards sandwiching the second shutter.

4. The focal plane shutter of claim 1, wherein the another end of the sub-board is secured to a surface, of the second portion, facing the first shutter.

5. The focal plane shutter of claim 4, comprising a second board including a second opening, the first and second boards sandwiching the first shutter.

6. An optical apparatus comprising a focal plane shutter comprising:
   a first board including a first opening;
   a first shutter including plural first blades, and facing the first board and closing the first opening such that an overlapped state where the plural first blades overlap each other is shifted to an expanded state where the plural first blades expand; and
   a drive member connected to a root portion of the first shutter and causing the first shutter to move,
   wherein the first board includes:
      a main board, the main board having a substantially lateral U-shape; and
      a sub-board secured to the main board,
   the main board and the sub-board cooperatively define the first opening,
   the main board includes:
      first and second portions extending in a direction intersecting with a movement direction of the first shutter, and facing each other; and
      a third portion continuous to the first and second portions, extending in the movement direction, and positioned in the root portion side,
   front end portions of the first and second portions are spaced away from each other,
   when the first shutter closes the first opening, the first shutter moves from the second portion side to the first portion side,
   the sub-board faces the third portion, extends in the movement direction, is positioned in a front end portion side of the first shutter, and is secured to the front end portions of the first and second portions,
   one end of the sub-board is secured to a surface, of the first portion, facing the first shutter and another end of the sub-board is secured to a surface of the second portion, opposite to a surface of the second portion facing the first shutter, and
   a portion between the one end and the another end does not overlap the main board.

* * * * *

UNITED STATES PATENT AND TRADEMARK OFFICE
CERTIFICATE OF CORRECTION

PATENT NO. : 9,395,599 B2  
APPLICATION NO. : 14/626014  
DATED : July 19, 2016  
INVENTOR(S) : Seiichi Oishi et al.

Page 1 of 1

It is certified that error appears in the above-identified patent and that said Letters Patent is hereby corrected as shown below:

On the Title Page, item (72) "Seiichi Oishii" should read --Seiichi Oishi--.

Signed and Sealed this  
Twenty-third Day of August, 2016

Michelle K. Lee  
*Director of the United States Patent and Trademark Office*